(12) United States Patent
Tamaki et al.

(10) Patent No.: US 8,462,718 B2
(45) Date of Patent: Jun. 11, 2013

(54) RESOURCE ASSIGNMENT METHOD AND COMMUNICATION APPARATUS FOR WIRELESS COMMUNICATION SYSTEM

(75) Inventors: Satoshi Tamaki, Kokubunji (JP); Rintaro Katayama, Tachikawa (JP); Hirotake Ishii, Yokohama (JP); Tomonori Yamamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 12/788,509

(22) Filed: May 27, 2010

(65) Prior Publication Data

US 2010/0309864 A1 Dec. 9, 2010

(30) Foreign Application Priority Data

Jun. 5, 2009 (JP) .................................. 2009-135690

(51) Int. Cl.
*H04W 4/00* (2009.01)

(52) U.S. Cl.
USPC ......................................... 370/329; 455/63.1

(58) Field of Classification Search
USPC ........................................ 370/329; 455/63.1
See application file for complete search history.

(56) References Cited

U.S. PATENT DOCUMENTS

| 2006/0212133 A1 | 9/2006 | Damnjanovic et al. |
| 2008/0247375 A1* | 10/2008 | Muharemovic et al. ...... 370/344 |
| 2010/0056197 A1* | 3/2010 | Attar et al. .................... 455/522 |

FOREIGN PATENT DOCUMENTS

JP 2008-530918 A 8/2008

OTHER PUBLICATIONS

3rd Generation Partnership Project; Technical Specification Group Radio Access Network; Evolved Universal Terrestrial Radio Access (E-UTRA); Physical Channels and Modulation (Release 8); 3GPP TS 36.211 V8.6.0 (Mar. 2009).
3rd Generation Partnership Project; Technical Specification Group Radio Access Network; Evolved Universal Terrestrial Radio Access (E-UTRA); Physical Channels and Modulation (Release 8); 3GPP TS 36.423 V8.6.0 (Mar. 2009).

\* cited by examiner

*Primary Examiner* — Sai-Ming Chan
(74) *Attorney, Agent, or Firm* — Mattingly & Malur, PC

(57) ABSTRACT

Resources are assigned in units of resource blocks each composed of one or more subcarriers, inter-cell interference adjustment control information is notified to each other among base stations, a transmit power limitation on each of the resource blocks in a cell is decided based on the inter-cell interference adjustment control information; and the decision of the transmit power limitation is changed sequentially beginning at a resource block having a transmit power limitation different from the transmit power limitation on an adjacent resource block.

8 Claims, 19 Drawing Sheets

MT'S TRANSMIT POWER CLASSES

|          | CLASS A | CLASS B | CLASS C |
|----------|---------|---------|---------|
| SUBBAND c | × | × | ○ |
| SUBBAND b | × | ○ | △ |
| SUBBAND a | ○ | △ | △ |

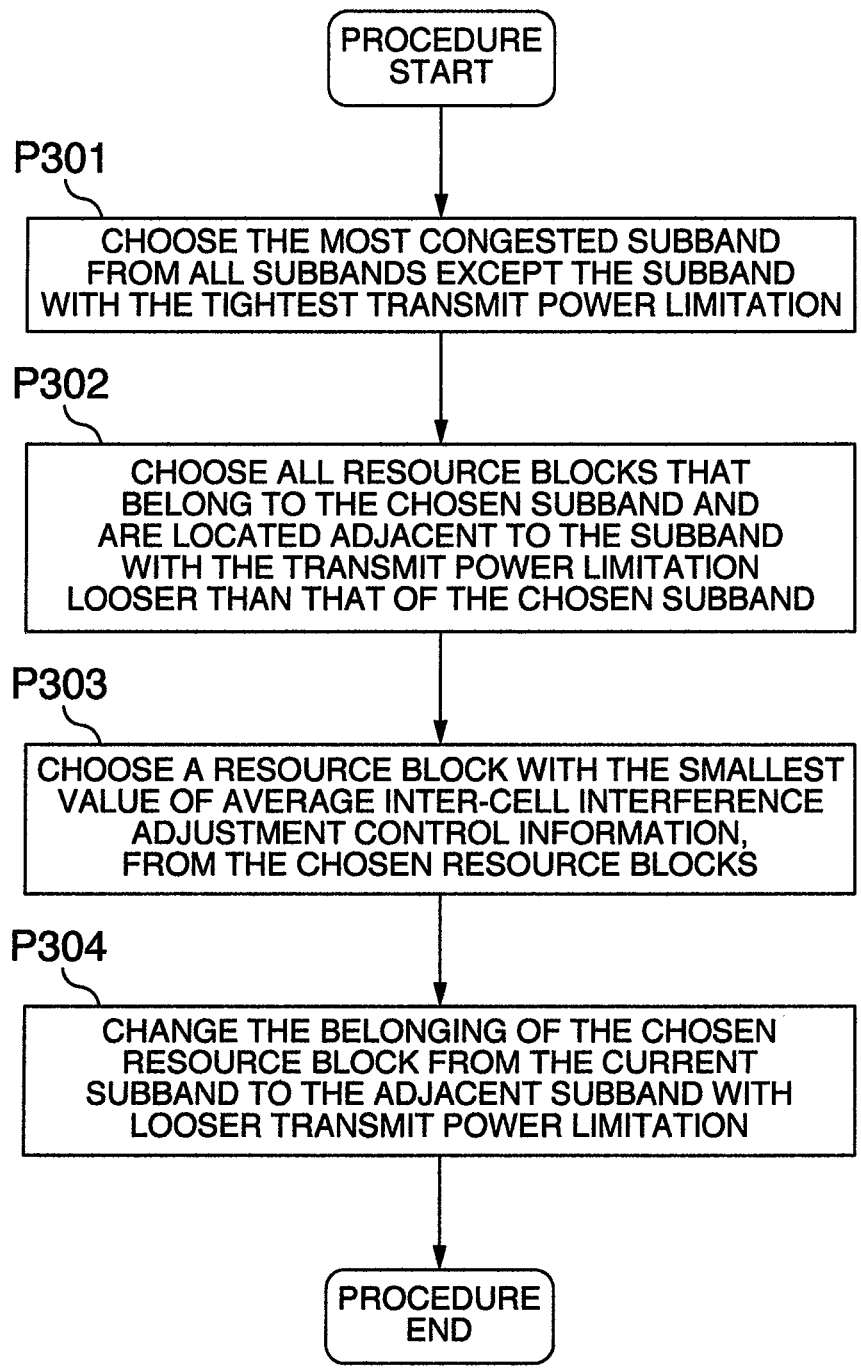

FIG.18

| 1810 | 1820 | 1830 |
|---|---|---|
| ID OF MT1 | DOWNLINK RECEIVED POWER OF MT1 | UPLINK TRANSMIT POWER OF MT1 |
| ID OF MT2 | DOWNLINK RECEIVED POWER OF MT2 | UPLINK TRANSMIT POWER OF MT2 |
| ID OF MT3 | DOWNLINK RECEIVED POWER OF MT3 | UPLINK TRANSMIT POWER OF MT3 |
| ID OF MT4 | DOWNLINK RECEIVED POWER OF MT4 | UPLINK TRANSMIT POWER OF MT4 |
| ⋮ | ⋮ | ⋮ |

FIG.19

| 1910 | 1920 | 1930 |
|---|---|---|
| ID OF MT1 | DOWNLINK ASSIGNMENT OF MT1 | UPLINK ASSIGNMENT OF MT1 |
| | ASSIGNED RESOURCE BLOCKS (1940) | ASSIGNED RESOURCE BLOCKS (1940) |
| | TIME STAMP OF ASSIGNMENT (1950) | TIME STAMP OF ASSIGNMENT (1950) |
| ID OF MT2 | DOWNLINK ASSIGNMENT OF MT2 | UPLINK ASSIGNMENT OF MT2 |
| | ASSIGNED RESOURCE BLOCKS | ASSIGNED RESOURCE BLOCKS |
| | TIME STAMP OF ASSIGNMENT | TIME STAMP OF ASSIGNMENT |
| ⋮ | ⋮ | ⋮ |

FIG.20

| |
|---|
| THRESHOLD FOR REPORTED VALUE OF DOWNLINK RECEIVED POWER A ~2010 |
| THRESHOLD FOR REPORTED VALUE OF DOWNLINK RECEIVED POWER B ~2020 |
| THRESHOLD FOR REPORTED VALUE OF UPLINK TRANSMIT POWER A ~2030 |
| THRESHOLD FOR REPORTED VALUE OF UPLINK TRANSMIT POWER B ~2040 |

FIG.22

| MT'S ID 2210 | CLASS FOR UPLINK 2220 | CLASS FOR DOWNLINK 2230 |
|---|---|---|
| ID OF MT1 | CLASS B | CLASS B |
| ID OF MT2 | CLASS C | CLASS C |
| ID OF MT3 | CLASS B | CLASS B |
| ID OF MT4 | CLASS A | CLASS A |
| ID OF MT5 | CLASS A | CLASS A |
| ID OF MT6 | CLASS B | CLASS B |
| ID OF MT7 | CLASS B | CLASS C |
| ID OF MT8 | CLASS C | CLASS C |

RESOURCE ASSIGNMENT METHOD AND COMMUNICATION APPARATUS FOR WIRELESS COMMUNICATION SYSTEM

INCORPORATION BY REFERENCE

The present application claims priority from Japanese application JP-2009-135690 filed on Jun. 5, 2009, the content of which is hereby incorporated by reference into this application.

BACKGROUND OF THE INVENTION

The present invention relates to a wireless communication system, for example, to a resource assignment method and a communication apparatus that implements the method in a cellular wireless communication system that employs the Orthogonal Frequency Division Multiplexing method.

As broader band wireless communication becomes more and more popular, the multicarrier communication method has become increasingly used in which transmission information is divided into multiple frequency bands, called subcarriers, for use in communication. The OFDM (Orthogonal Frequency Division Multiplexing) method, one of the multicarrier communication methods, is widely used in many systems because the OFDM method uses the narrowed bandwidth of each subcarrier to increase resistance to delayed waves and, at the same time, makes use of signal orthogonality to eliminate the need for the guard bands between subcarriers for higher frequency usage efficiency. In addition, OFDMA (Orthogonal Frequency Division Multiple Access) method, in which the OFDM radio resource is divided into units, hereinafter called resource blocks, each having one or more subcarriers and a predetermined time width for realizing multiple access, is employed in a system called WiMAX (Worldwide Interoperability of Microwave Access) and a system called LTE (Long Term Evolution).

For example, 3rd Generation Partnership Project: TSG RAN; E-UTRA; Physical Channels and Modulation (Release 8), 3GPP TS 36.211 V8.6.0, March 2009 describes radio resource division and the modulation method in LTE. The document describes the OFDMA method in which, for downlink data communication from a base station (BS) to a mobile terminal (MT), the modulation signal for each user is assigned directly to the time and the frequency resource. The document also describes the SC-FDMA (Single Carrier-Frequency Division Multiple Access) method in which, for uplink data communication from a mobile terminal to a base station, the modulation signal for each user is once converted via DFT (Discrete Fourier Transform) and then assigned to the time and the frequency resource.

In those radio communication methods, the ICIC (Inter-Cell Interference Coordination) technology is used that limits the resources used for each cell in order to reduce inter-cell interference. For example, JP-A-2008-530918 discloses the technology for using different frequencies according to the location of a mobile terminal in a cell in order to reduce inter-cell interference.

Because the load status, such as the number of mobile terminals or the amount of communication, differs among cells and changes over time, fixed limitation on the resources would generate an imbalance in the usage status of resources in each cell. To prevent this imbalance, a method is proposed for dynamically coordinating the resource limitation by exchanging load information among cells. 3rd Generation Partnership Project: TSG RAN; E-UTRAN; X2 application protocol (X2AP) (Release 8), 3GPP TS 36.423 V8.5.0, March 2009 standardizes, as the load information exchanged among cells, the following information for the X2 interface that is the interface between base stations: UL Interference Overload Indication indicating the interference level received by a base station for each resource block, UL High Interference Indication indicating the sensitivity to interference for each resource block from each neighboring cell, and Relative Narrowband Tx Power indicating the transmit power information for each resource block from the base station.

SUMMARY OF THE INVENTION

To keep track of differences or changes in the load status of each cell, the dynamic Inter-Cell Interference Coordination technology, which uses load information notified among cells, is required to notify load information in small units to change the resource limitation. On the other hand, notifying load information in small units to change the resource limitation results in the generation of a status in which the resource limitation in each cell is fragmented into small units.

The present invention provides a resource assignment method and a resource assignment device designed with an aim to implement at least one of the prevention of an imbalance in the resource usage status of each cell, a reduction in inter-cell interference, and a reduction in resource limitation fragmentation in each cell.

As means for solving at least one of the problems described above, a signal processing method in one aspect of the present invention comprises the steps of assigning resources in units of resource blocks each composed of one or more subcarriers; notifying inter-cell interference adjustment control information to each other among base stations; deciding a transmit power limitation on each of the resource blocks in a cell based on the inter-cell interference adjustment control information; and changing the decision of the transmit power limitation sequentially beginning at a resource block having a transmit power limitation different from the transmit power limitation on an adjacent resource block.

According to one aspect of the present invention, the dynamic inter-cell interference adjustment technology, if used in a wireless communication system, reduces inter-cell interference while preventing an imbalance in the resource usage status in each cell. In addition, according to one aspect of the present invention, resource limitation fragmentation is reduced in each cell.

Other objects, features and advantages of the invention will become apparent from the following description of the embodiments of the invention taken in conjunction with accompanying drawings.

BRIEF DESCRIPTION OF THE DRAWINGS

FIG. 17 is a flowchart showing an example of the processing flow of the decision of easing a transmit power limitation.

FIG. 18 is a diagram showing an example of a table of the values reported by the mobile terminals under control of a base station.

FIG. 19 is a diagram showing an example of a table indicating the assignment status of the mobile terminals in a base station.

FIG. 20 is a diagram showing an example of a table storing the thresholds used for the downlink transmit power decision processing and the uplink transmit power decision processing.

FIG. 22 is a diagram showing an example of a table maintained in a base station for storing the belonging classes of the mobile terminals.

DETAILED DESCRIPTION OF THE INVENTION

Embodiments of the present invention will be described below in detail with reference to the drawings.

Note that, in the description below, the pilot signal, also called the reference signal, refers to a fixed or semi-fixed pattern signal used as the amplitude or phase reference signal for demodulating the received signal or as the reference signal for estimating the received power or the radio propagation channel information. The pilot signal used as the reference signal for demodulation and the pilot signal for estimating the received power or the radio propagation channel information may be the same or different. The pilot signal may be a signal common to multiple mobile terminals in a cell or may be used individually for each mobile terminal.

In the example given below, though specific values are sometimes used for the number or width of resource blocks, band, and mobile terminal classes used for resource assignment, the values are not limited to those used in the description but any other values may also be used.

In the description below, the sequence or the processing flow is sometimes described in a specific order. Except for order-dependent processing in which the result of processing is used by the next processing, the order of processing may be changed or the processing may be performed in parallel.

Figure 1:
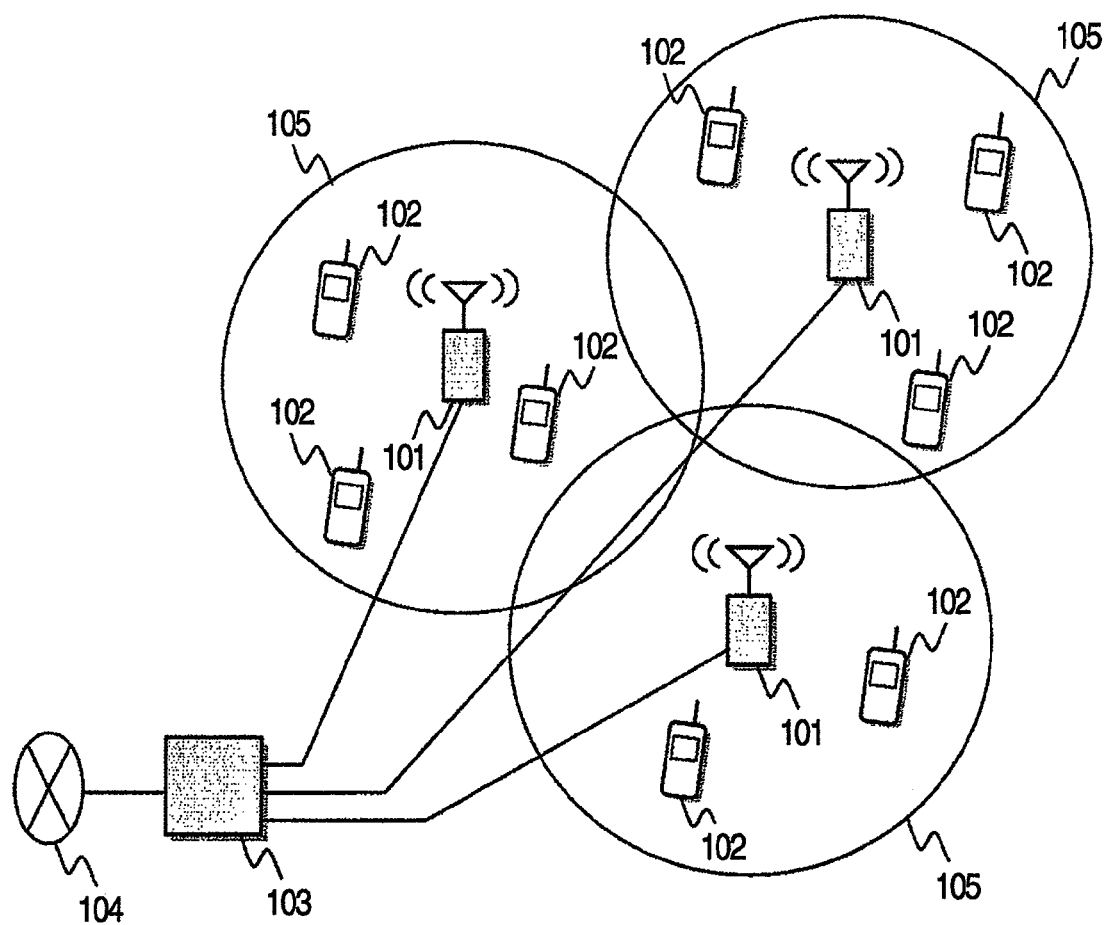
FIG. 1 is a diagram showing an example of the configuration of a cellular wireless communication system.

FIG. 1 is a diagram showing an example of the configuration of a cellular wireless communication system. The cellular wireless communication system in the example of the configuration comprises multiple base stations 101, multiple mobile terminals 102, a base station control device 103 connected to the multiple base stations, and a network 104. The communication in which the base station 101 transmits data and the mobile terminal 102 receives the transmitted data is called downlink communication, and the communication in which the mobile terminal 102 transmits data and the base station 102 receives the transmitted data is called uplink communication. Similarly, in the description below, the radio signal transmitted by the base station 101 and received by the mobile terminal 102 is called a downlink signal; conversely, the radio signal transmitted by the mobile terminal 102 and received by the base station 101 is called an uplink signal.

The base station 101 is connected to the network 104 through a wired line via the base station control device 103, transmits the downlink signal to the mobile terminal 102, and receives the uplink signal transmitted by the mobile terminal 102. The base station 101 performs processing, hereinafter called scheduling, in which determination is made as to which resource blocks of the downlink signal or uplink signal are to be used for the communication with which mobile terminals 102 or as to the parameters used for transmission of signals such as the transmit power. The base station 101 sends a notification to all mobile terminals 102 with the scheduling result included in the downlink signal. Alternatively, the base station 101 may send the notification only to the mobile terminals 102 that will be affected by the scheduling.

A cell 105 indicates an approximate range in which the base station 101 and the mobile terminals 102 can wirelessly communicate each other. A cell, though circular in the figure, may have any topological shape. For example, with multiple base stations 101 in the same location, it is possible to consider that there are different cells 105 depending upon the direction of each base station 101. In addition, multiple base stations 101 need not be separate devices but one device may communicate with mobile terminals 102 in the range of multiple cells 105.

The X2 interface, the interface between base stations, is a logical interface. When information is exchanged between base stations via the X2 interface, the base stations may be connected directly via a wired line, may be connected via the base station control device 103 as shown in the configuration example in FIG. 1, or may be connected via the network 104.

Figure 2:
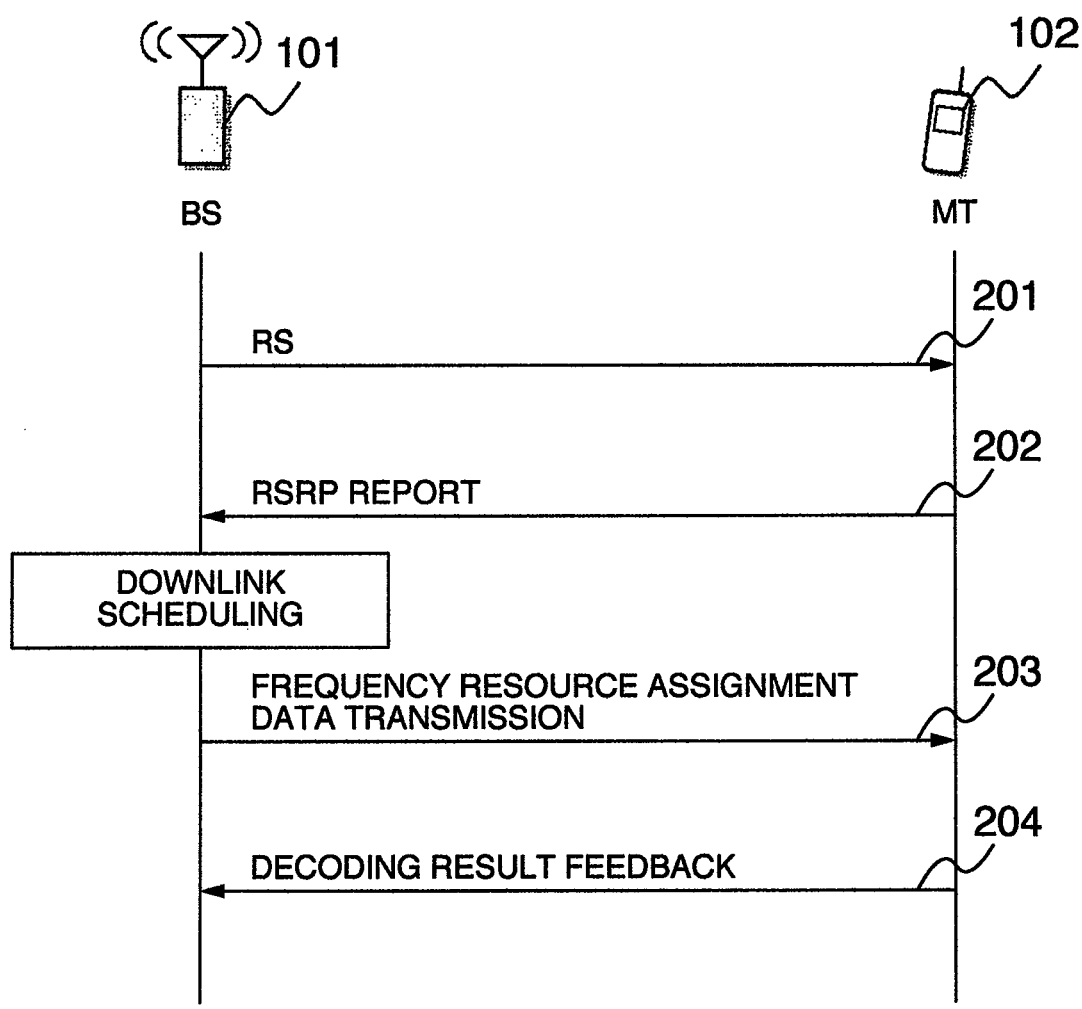
FIG. 2 is a diagram showing an example of the data transmission sequence in downlink communication.

FIG. 2 is a diagram showing an example of the data transmission sequence in downlink communication.

The mobile terminal 102 receives the pilot signal and the control information from the base station in sequence 201. The control information is information notified to all mobile terminals or specific mobile terminals in the cell and includes the information on the signal bandwidth, the transmit power of the base station, and so on. Next, based on the received pilot signal and the control information, the mobile terminal measures the received power and, in sequence 202, reports the received power to the base station. The reported received power, a value such as RSRP (Reference Signal Received Power) or RSRQ (Reference Signal Received Quality), may be the measured received power itself or the average value of multiple measurement results. The base station performs downlink scheduling processing based on the reported received power of each mobile terminal and determines the resource assignment information that indicates which resource blocks are to be assigned to the downlink signal transmission of which mobile terminal. Next, in sequence 203, the base station transmits the resource assignment information and data to the mobile terminal based on the result of downlink scheduling processing. Based on the received resource assignment information, the mobile terminal receives data, transmits information, which indicates whether or not the data is successfully decoded, to the base station in sequence 204, and passes control back to sequence 201 for repeating the processing until all data transmission is terminated.

When the processing is repeated, the whole processing from sequence 201 to sequence 204 need not be performed but a part of the processing may be skipped. In addition, multiple sequences may be performed at the same time, for example, the decoded result feedback in sequence 204 and the received power report in sequence 202 may be performed at the same time.

Figure 3:
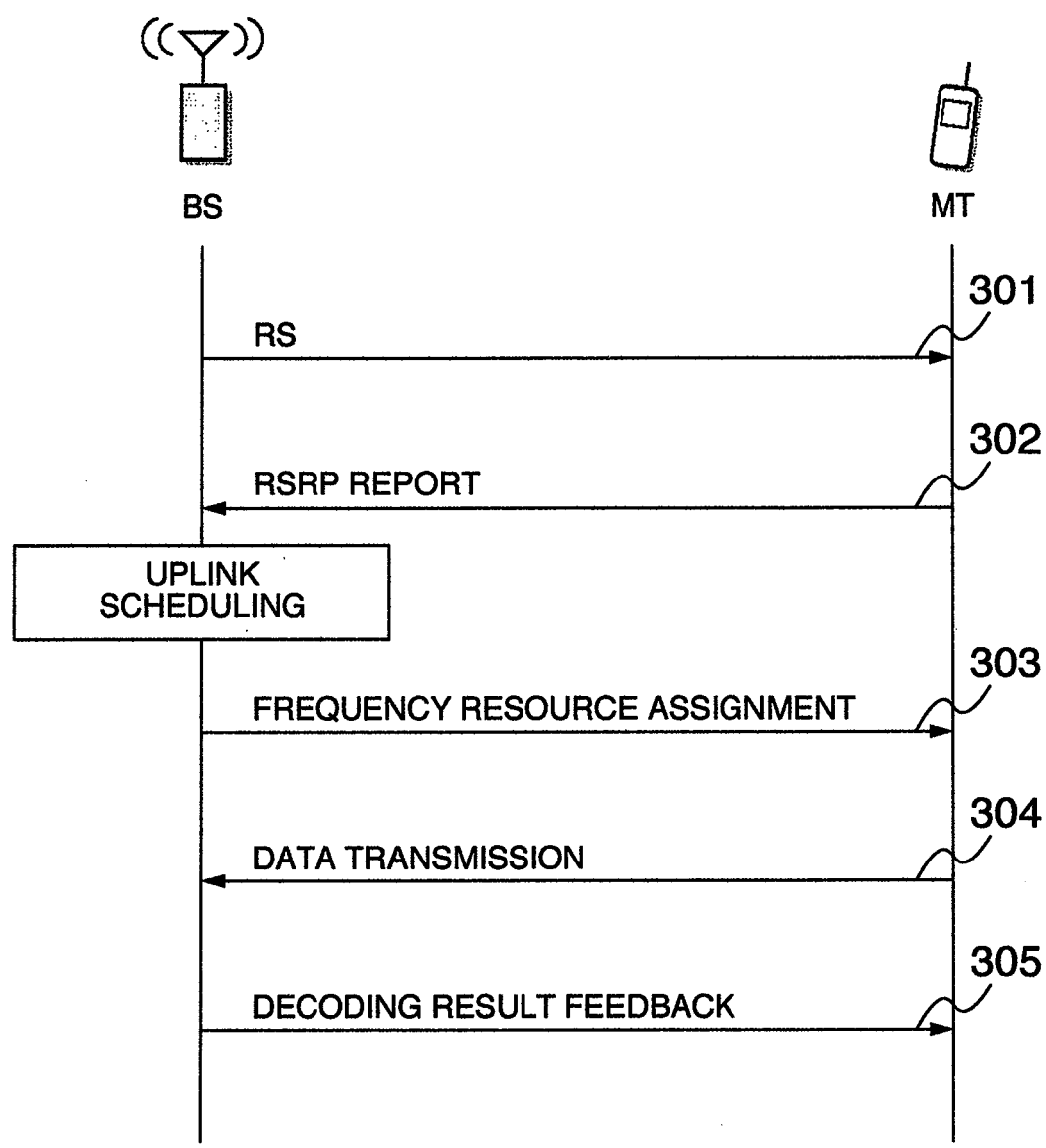
FIG. 3 is a diagram showing an example of the data transmission sequence in uplink communication.

FIG. 3 is a diagram showing an example of the data transmission sequence in uplink communication.

The mobile terminal receives the pilot signal and the control information from the base station in sequence 301. The control information is information notified to all mobile terminals or specific mobile terminals in the cell and includes the information on the signal bandwidth, the transmit power of the base station, and so on. Next, based on the received pilot signal and the control information, the mobile terminal measures the received power and, in sequence 302, reports the received power and the mobile terminal transmits power to the base station. The base station performs uplink scheduling processing, based on the reported received power and transmits power of each mobile terminal and the uplink received power measured by the base station, and determines the resource assignment information that indicates which resource blocks are to be assigned to the uplink signal transmission of which mobile terminal. Next, in sequence 303, the base station transmits the resource assignment information to the mobile terminal based on the result of the uplink scheduling processing. Using the resource blocks based on the received resource assignment information, the mobile terminal transmits data to the base station in sequence 304. The base station receives the data, transmits information, which indicates whether or not the data is successfully decoded, to the mobile terminal in sequence 305, and passes control back to sequence 301 for repeating the processing until all data transmission is terminated.

When the processing is repeated, the whole processing from sequence 301 to sequence 305 need not be performed but a part of the processing may be skipped. In addition, multiple sequences may be performed at the same time, for example, the decoded result feedback in sequence 305 and the resource assignment information transmission in sequence 303 may be performed at the same time.

In FIG. 2 and FIG. 3, when data communication is carried out, the base station 101 transmits the pilot signal and the control information to the mobile terminal 102 and, as a response, receives the information on the received power from the mobile terminal. The processing in both figures is common in that the frequency resources to be assigned to the mobile terminal are determined during the scheduling processing and are assigned to the mobile terminal 102.

FIG. 18 is a diagram showing an example of the table of the values reported by the mobile terminals under control of a base station. The base station saves a downlink received power value 1820 and an uplink transmit power value 1830, reported by a mobile terminal, as well as an ID 1810 of the mobile terminal. The values stored in the base station may be the actual values reported by the mobile terminals, the result generated by the statistical processing for the values reported by the mobile terminals, or both. The data structure for storing the information may be in any format in which the relation between the mobile terminal ID and the reported values may be saved. The information that is saved is not limited to the mobile terminal ID, downlink received power value, and uplink transmit power value but may include other information at the same time.

FIG. 19 is a diagram showing an example of the table in a base station indicating the assignment status of the mobile terminals. The base station saves a downlink assignment status 1902 and an uplink assignment status 1930, generated as a result of uplink scheduling processing and downlink scheduling processing, as well as an ID of the mobile terminal. The uplink assignment status and the downlink assignment status each include information indicating assigned resource blocks 1940 and information indicating the time stamp of assignment 1950. Note that each of the number of stored downlink assignment statuses and the number of stored uplink assignment statuses need not be one for each mobile terminal; instead, different number of assignment statuses may be stored according to mobile terminals or the number of stored uplink assignment statuses and the number of stored downlink assignment statuses may be different. The data structure for storing the information may be in any format in which the relation among the mobile terminal ID, the uplink assignment status, and the downlink assignment status may be saved. The information that is stored is not limited to the mobile terminal ID, downlink assignment status, and uplink assignment status but may store other information at the same time.

Figure 4:
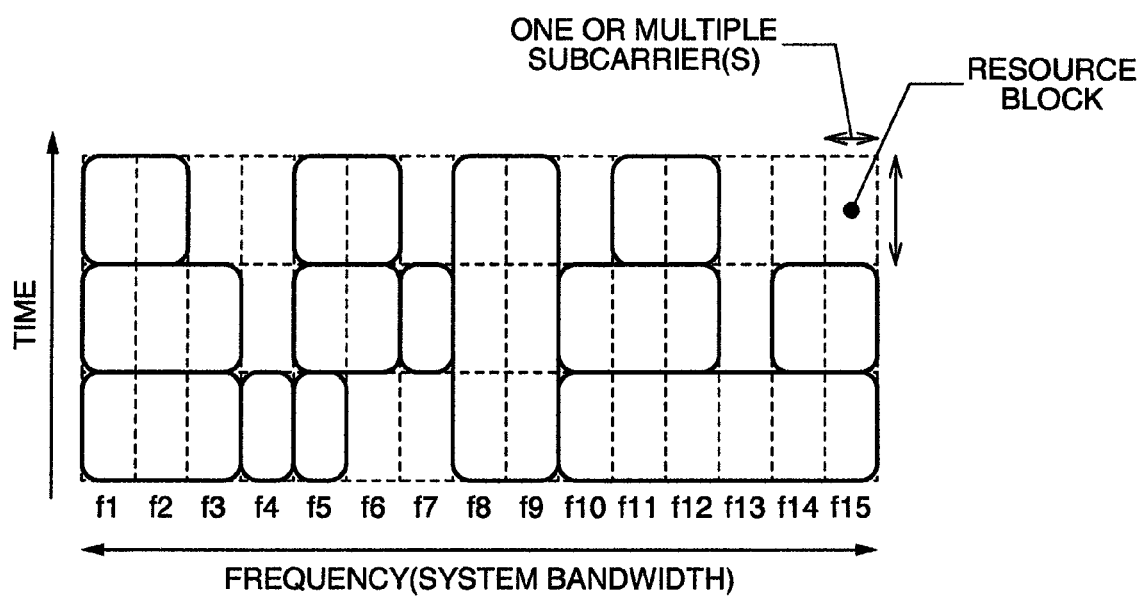
FIG. 4 is a diagram showing an example of resource assignment in OFDMA.

FIG. 4 is a diagram showing an example of resource assignment in OFDMA. Resources are assigned in units of one or more resource blocks each of which is an assignment unit enclosed by dotted lines. A resource block is a range of time and frequency delimited by unit times in the time axis direction and by one or more subcarriers in the frequency direction. For example, in the case of LTE, the unit time of a resource block is 1 ms which corresponds to 6 or 7 FDM symbols and the number of subcarriers per resource block is 12 in the frequency direction. Resource assignment for uplink or downlink communication is performed by assigning one or more resource blocks at a time as indicated by an assigned resource in the figure.

The term "adjacent resource blocks", included in the description below refers to the resource blocks adjacent in the frequency direction. For example, the resource blocks at frequency f8 in FIG. 4 are adjacent to both the resource blocks at frequency f7 and the resource blocks at frequency f9. The resource blocks at both ends of a system bandwidth may be considered non-adjacent or adjacent each other. For example, in the example in FIG. 4, the resource block at frequency f1 may be considered resource block adjacent only to the resource block at frequency f2 or considered resource block adjacent to the resource block at frequency f15.

Figure 5:
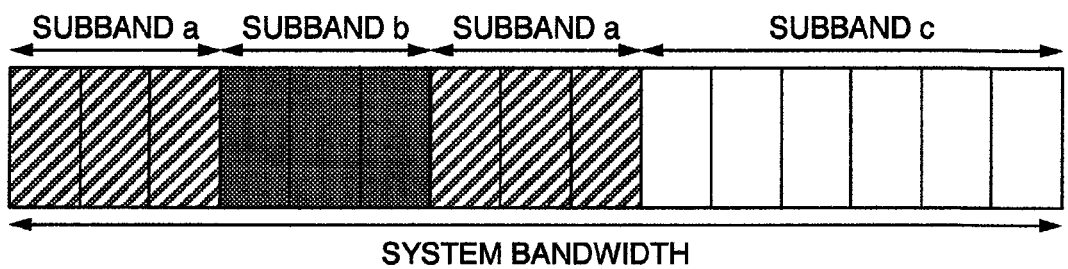
FIG. 5 is a diagram showing an example of the partitioning of bandwidth for inter-cell interference adjustment.

FIG. 5 is a diagram showing an example of the partitioning of bandwidth for inter-cell interference adjustment. For inter-cell interference adjustment, the system band is partitioned into one or more subbands each of which has a bandwidth equivalent to one or more resource blocks. FIG. 5 is a diagram showing an example in which the system bandwidth has a bandwidth equivalent to 15 resource blocks, subband a is assigned the bandwidth equivalent to 6 resource blocks, subband b is assigned the bandwidth equivalent to 3 resource blocks, and subband c is assigned the bandwidth equivalent to 6 resource blocks. One subband may correspond to consecutive resource blocks as shown in the example of subband b and subband c or to a set of non-consecutive resource blocks as shown in the example of subband a.

The system band, though partitioned into three subbands in the example shown in FIG. 5, need not always be partitioned into three but may be partitioned into two subbands or four or more subbands, or one base station may use the system band as one subband without partitioning it. In addition, one subband need not always have a bandwidth composed of multiple resource blocks but may have a bandwidth composed of one resource block.

Figure 6:
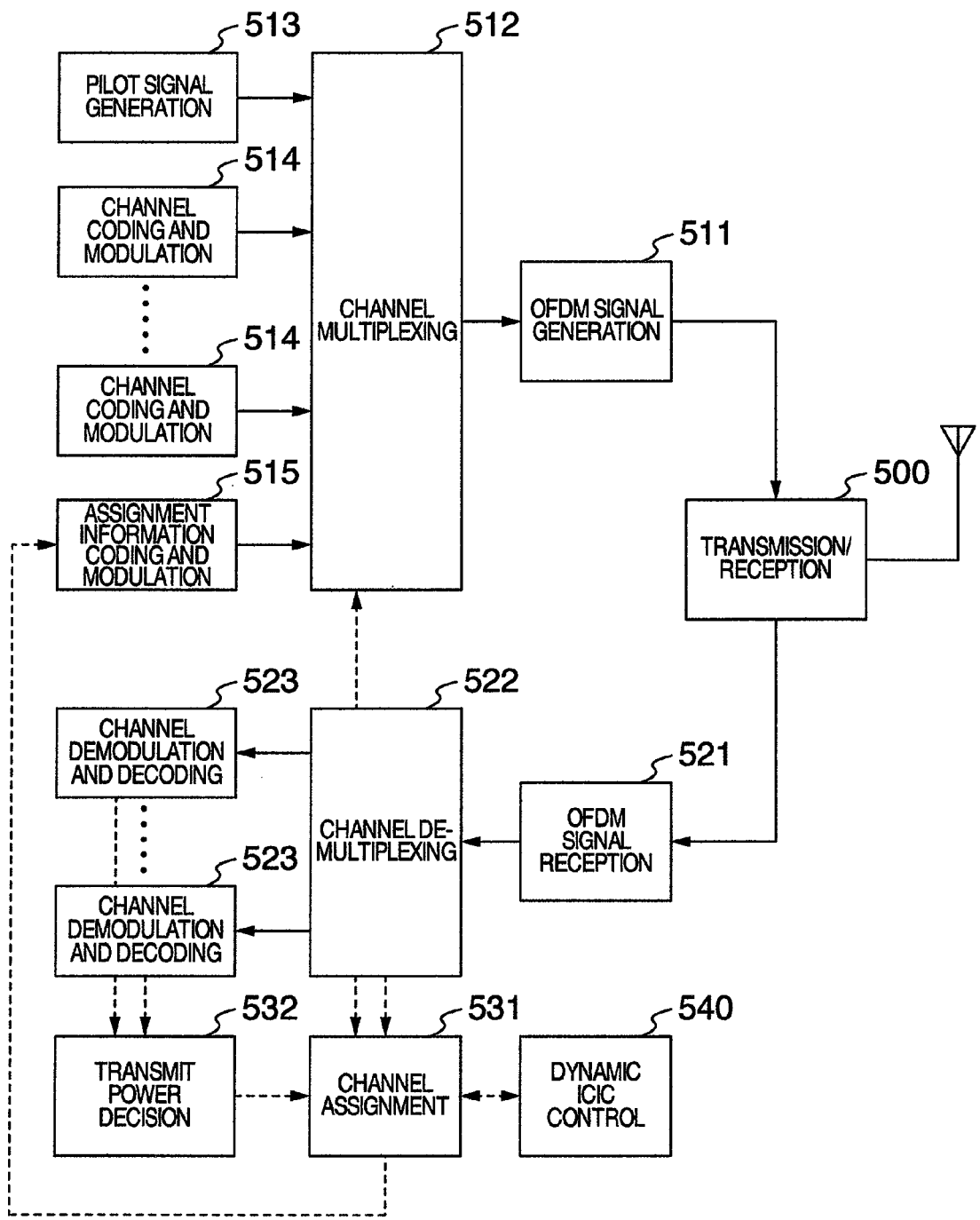
FIG. 6 is a diagram showing an example of the block diagram representing signal processing in a base station to which the present invention is applied.

FIG. 6 is a diagram showing an example of the block diagram representing the signal processing in the base station 101 in this embodiment. To generate a transmission signal, the base station 101 comprises an OFDM signal generation unit 511, a channel multiplexing unit 512, a pilot signal generation unit 513, channel coding and modulation units 514, and an assignment information coding and modulation unit 515. To receive a signal, the base station comprises an OFDM signal reception unit 521, a channel demultiplexing unit 522, and channel demodulation and decoding units 523. The base station also comprises a transmission/reception unit 500, a channel assignment unit 531, and a transmit power decision unit 532.

The pilot signal generation unit 513 generates a pre-defined pattern signal as the reference signal, which will be used by a mobile terminal for receiving the downlink signal and for measuring the received power, and outputs the generated signal to the channel multiplexing unit 512.

The channel coding and modulation unit 514 divides the downlink signal to be transmitted to a mobile terminal, randomizes the signal by performing the exclusive OR operation between the signal and a pseudo-random number sequence, adds error detecting code such as CRC, codes the signal using error-correcting code such as Turbo coding or convolution coding, converts the order of the signal through the interleave processing, modulates the signal using the modulation method such as PSK or QAM, adds the amplitude corresponding to the transmit power according to the mobile terminal to which the signal is transmitted, and outputs the signal to the channel multiplexing unit 512.

The assignment information coding and modulation unit 515 multiplexes the uplink and downlink assignment information on one or more users notified by the channel assignment unit 531, performs the coding and modulation processing for the multiplexed information, and outputs the coded and modulated information to the channel multiplexing unit 512. In addition, when the transmit power control information is notified by the channel assignment unit 531, the assignment information coding and modulation unit 515 performs coding and modulation processing for the transmit power control information and outputs the coded and modulated information to the channel multiplexing unit 512.

The channel multiplexing unit 512 assigns the input from the corresponding channel coding and modulation unit 514 to the corresponding resource blocks according to the downlink assignment information notified by the channel assignment unit 531, multiplexes this input with the input from the pilot signal generation unit 513 and the input from the assignment information coding and modulation unit 515, and outputs the multiplexed signal to the OFDM signal generation unit 511.

The OFDM signal generation unit 511 generates the time domain signal for the input from the channel multiplexing unit 512 through the operation such as the inverse FFT operation, adds Cyclic Prefix, which is a copy of a part of the time domain signal, to the signal as necessary, and outputs the signal to the transmission/reception unit 500.

The transmission/reception unit 500 converts the frequency of the input signal from the OFDM signal generation unit 511 to the radio frequency signal and emits the this signal from the antenna. The transmission/reception unit 500 also converts the radio frequency signal, received via the antenna, to the baseband band signal and outputs this signal to the OFDM signal reception unit 521.

The OFDM signal reception unit 521 performs the FFT operation at the time the signal is received from the transmission/reception unit 500 to convert the received signal on a subcarrier basis and outputs the converted signal to the channel demultiplexing unit 522.

Based on the uplink assignment information notified by the channel assignment unit 531, the channel demultiplexing unit 522 outputs the corresponding resource block signal, included in the signal received from the OFDM signal reception unit 521, to the corresponding channel demodulation and decoding unit 523.

The channel demodulation and decoding unit 523 performs the detection processing and demodulation processing, which are the inverse of the modulation processing performed by the mobile terminal at transmission time, for the signal received from the channel demultiplexing unit 522 and, as necessary, the equalization processing and the inverse DFT processing, performs the de-interleave processing that is the inverse of the interleave processing performed by the mobile terminal at transmission time, performs the decoding processing that is the inverse of error-correcting coding performed by the mobile terminal at transmission time, determines if the decoding is performed successfully based on the error-detecting processing such as CRC added by the mobile terminal at transmission time and, if the decoding is performed successfully, outputs the decoded result as the received signal.

The channel demodulation and decoding unit 523 estimates the received-signal quality, such as the signal-to-interference ratio and the noise-to-power ratio, from the signal received from the channel demultiplexing unit 522 and outputs the estimated received-signal equality to the transmit power decision unit 532. In addition, when the transmit power information or received power information reported by the mobile terminal is included in the demodulated and demodulated signal, the channel demodulation and decoding unit 523 transmits the information to the transmit power decision unit 532.

The transmit power decision unit 532 performs the downlink transmit power decision processing based on the downlink received power information reported by the channel demodulation and decoding unit 523 and notifies the channel assignment unit 531 about the downlink transmit power and the downlink transmit power class. The transmit power decision unit 532 also notifies the channel assignment unit 531 about the uplink transmit power information, reported by the channel demodulation and decoding unit 523, as the uplink transmit power, and the value, generated by quantizing the transmit power information, as the uplink transmit power class. That is, the transmit power decision unit 532 notifies the channel assignment unit 531 about the transmit power information and the quantized transmit power information.

A dynamic ICIC control unit 540 receives the inter-cell interference adjustment control information from other base stations, and the congestion information on each of the uplink and downlink subbands from the channel assignment unit 531, decides the transmit power limitation on each of the uplink and the downlink subbands, and notifies the channel assignment unit 531 about transmit power limitation information on each of the uplink and downlink subbands. The dynamic ICIC control unit 540 also outputs the inter-cell interference adjustment control information to the other base stations according to the transmit power limitation on each subband.

Figure 21:
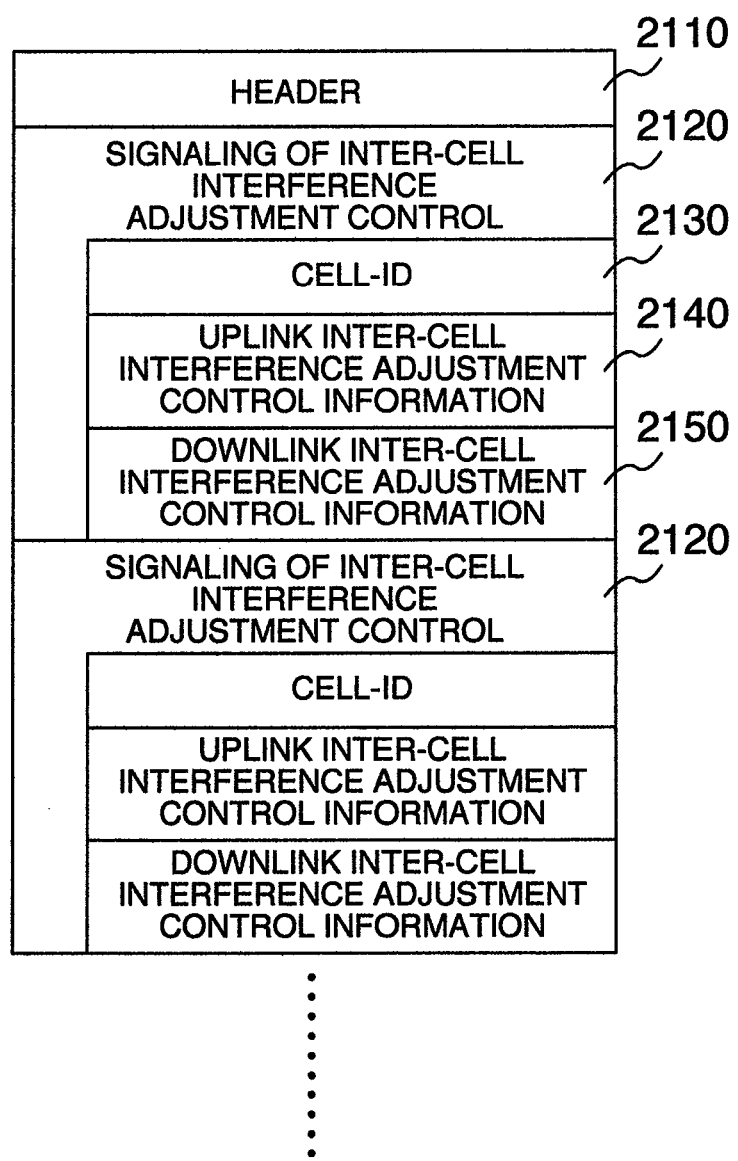
FIG. 21 is a diagram showing an example of inter-cell interference adjustment control information.

FIG. 21 is a diagram showing an example of the inter-cell interference adjustment control information. The inter-cell interference adjustment control information includes a header 2110 indicating that the information is the inter-cell interference adjustment control information and one or more inter-cell interference adjustment control signals 2120. The inter-cell interference adjustment control signal includes a cell ID 2130, uplink inter-cell interference adjustment control information 2140, and downlink inter-cell interference adjustment control information 2140.

Figure 7:
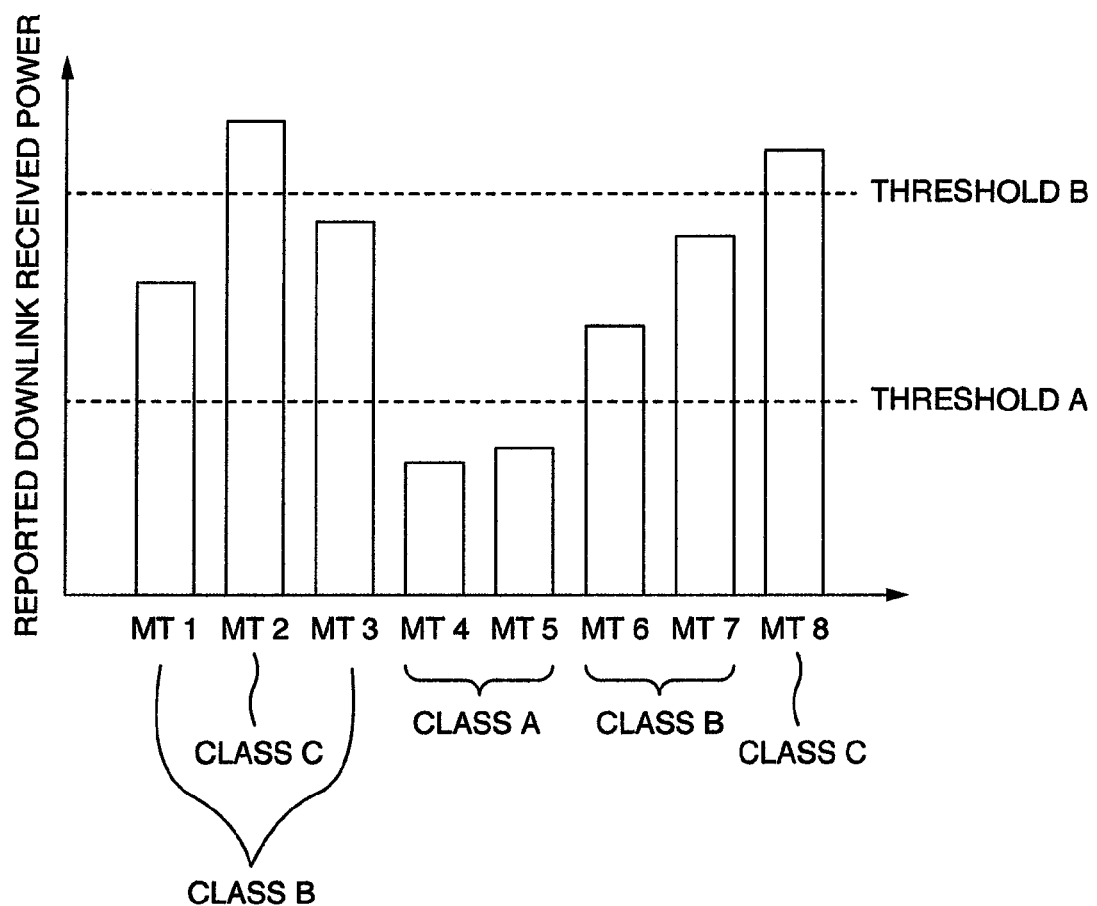
FIG. 7 is a diagram showing an example of the outline of downlink transmit power decision processing.

FIG. 7 is a diagram showing an example of the outline of the downlink transmit power decision processing in the transmit power decision unit 532. In the downlink transmit power decision processing, the transmit power decision unit 532 compares the downlink received power, reported by each mobile terminal, with the threshold and classifies a mobile terminal that reports the downlink received power lower than threshold A as class A, a mobile terminal that reports the downlink received power lower than threshold B but higher than threshold A as class B, and other mobile terminals as class C. After that, the transmit power decision unit 532 sets the downlink transmit power for each mobile terminal as follows: reference power +P1 dB for a mobile terminal belonging to class A, reference power +P2 dB for a mobile terminal belonging to class B, and reference power +P3 dB for a mobile terminal belonging to class C. And, the transmit power decision unit 532 notifies the channel assignment unit 531 about this setting. Note that the downlink transmit power decided for each mobile terminal as described above may be notified from the base station to a mobile terminal as the control signal.

Although the eight mobile terminals are classified into three classes according to the downlink received power in the example in FIG. 7, the number of mobile terminals and the number of classification classes are not limited to those values. The downlink received power reported by each mobile terminal may be the reported value itself or the value averaged for a given period of time. The relation between the downlink received power reported by each mobile terminal and the downlink transmit power for the mobile terminal may be any relation that satisfies the requirement that the downlink transmit power for a mobile terminal is not smaller than the downlink received power reported by the mobile terminal. The same power may be set for multiple classes; for example, the reference power +P1 dB for class A and the reference power +P2 dB for class B and class C. In addition, hysteresis may be introduced to the decision of the downlink transmit power for each mobile terminal; for example, it is possible not to change the downlink transmit power unless the class is changed by two stages. The value used as the decision criterion may be a value other than the downlink received power but may be any value that has the correlation with the communication quality, for example, the signal to interference power ratio may be used. The threshold used for classification may be changed depending upon the result of classification. The number of mobile terminals for each class may be set within a supposed range, for example, by increasing the threshold A if the result of classification indicates that the number of mobile terminals belonging to class A is smaller than the supposed value or, conversely, by decreasing the threshold A if the result of classification indicates that the number of mobile terminals belonging to class A is larger than the supposed value.

Figure 8:
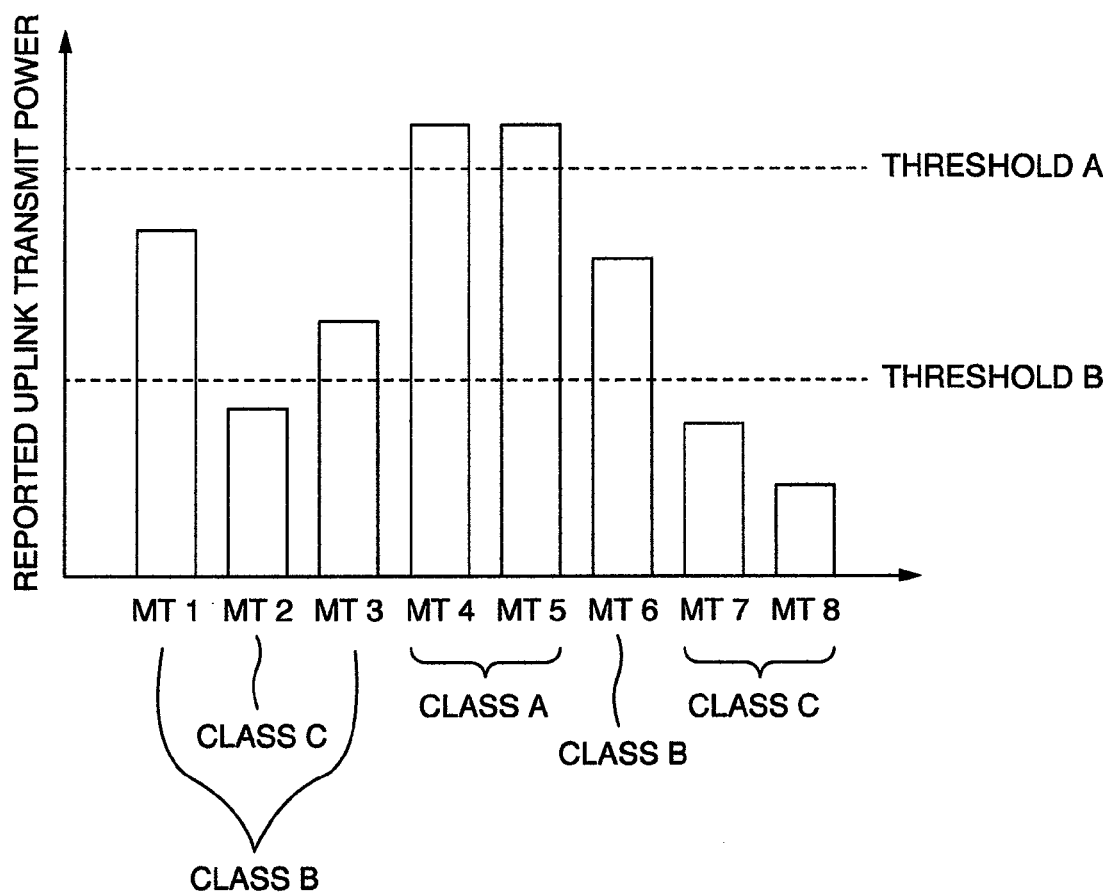
FIG. 8 is a diagram showing an example of the outline of uplink transmit power decision processing.

FIG. 8 is a diagram showing an example of the outline of the uplink transmit power decision processing in the transmit power decision unit 532. In the uplink transmit power decision processing, the transmit power decision unit 532 compares the uplink transmit power, reported by each mobile terminal, with the threshold and classifies a mobile terminal that reports the uplink transmit power higher than threshold A as class A, a mobile terminal that reports the uplink transmit power higher than threshold B but lower than threshold A as class B, and other mobile terminals as class C.

Although the eight mobile terminals are classified into three classes according to the uplink transmit power in the example in FIG. 8, the number of mobile terminals and the number of classification classes are not limited to those values. The uplink transmit power reported by each mobile terminal may be the reported value itself or the value averaged for a given period of time. In addition, the uplink transmit power reported by each mobile terminal may be a value that is not the transmit power itself but may be a difference between the transmit power value, determined by the power control procedure called Power Headroom and the maximum transmit power value of the mobile terminal.

The threshold used for classification may be changed depending upon the result of classification. The number of mobile terminals for each class may be set within a supposed range, for example, by decreasing the threshold A if the result of classification indicates that the number of mobile terminals belonging to class A is smaller than the supposed value or, conversely, by increasing the threshold A if the result of classification indicates that the number of mobile terminals belonging to class A is larger than the supposed value. The inter-cell load may also be distributed by decreasing each of the thresholds if the number of mobile terminals is smaller than the number of mobile terminals in the surrounding cells or by increasing each of the thresholds if the number of mobile terminals is larger than the number of mobile terminals in the surrounding cells.

The downlink transmit power classes determined by the downlink transmit power decision processing need not be the same as the uplink transmit power classes determined by the uplink transmit power decision processing. That is, when the same number of classes is used for the uplink transmit power and the downlink transmit power, a mobile terminal may belong to different classes between the uplink transmit power and the downlink transmit power as in the example of mobile terminal 7 in FIG. 7 and FIG. 8. In addition, the number of classification classes may be different between the uplink transmit power and the downlink transmit power; for example, the mobile terminals may be classified into three classes for the uplink transmit power but into two classes for the downlink transmit power.

The channel assignment unit 531 decides, for each of uplink and downlink transmissions, which mobile terminal and which channel signal are to be assigned to which resource blocks and notifies the channel multiplexing unit 512, channel demultiplexing unit 522, and assignment information coding and modulation unit 515 about the decided assignment. When deciding the assignment to downlink resource blocks, the channel assignment unit 531 takes into consideration the limitation based on the transmit power limitation information for each downlink subband notified by the dynamic ICIC control unit 540 and the downlink transmit power classes notified by the transmit power decision unit 532. When deciding the assignment to uplink resource blocks, the channel assignment unit 531 takes into consideration the limitation based on the transmit power limitation information for each uplink subband notified by the dynamic ICIC control unit 540 and the uplink transmit power classes notified by the transmit power decision unit 532.

FIG. 20 is a diagram showing an example of the table storing the thresholds used for the downlink transmit power decision processing and the uplink transmit power decision processing. The transmit power decision unit 532 stores threshold information 2010, 2020, 2030, and 2040 for use in the uplink transmit power decision processing and the downlink transmit power decision processing. Although the table in FIG. 20 stores two thresholds for each of the uplink and the downlink according to the examples in FIG. 7 and FIG. 8, the number of thresholds stored in the table is not limited to those values. The data structure for storing the information may be any format in which the thresholds for the processing described above can be saved. The table may store not only the thresholds for the processing described above but also other information.

FIG. 22 is a diagram showing an example of the table maintained in a base station for storing the belonging classes of each mobile terminal. The base station stores the belonging classes 2220 and 2230 of each mobile terminal, determined by the transmit power decision unit 532, as well as the ID 2210 of the mobile terminal. The data structure for storing the information may be any format in which the relation between the mobile terminal ID and the uplink and downlink classes can be saved. The table may store not only the mobile terminal ID, downlink class, and uplink class but also other information.

Figures 9, 10:
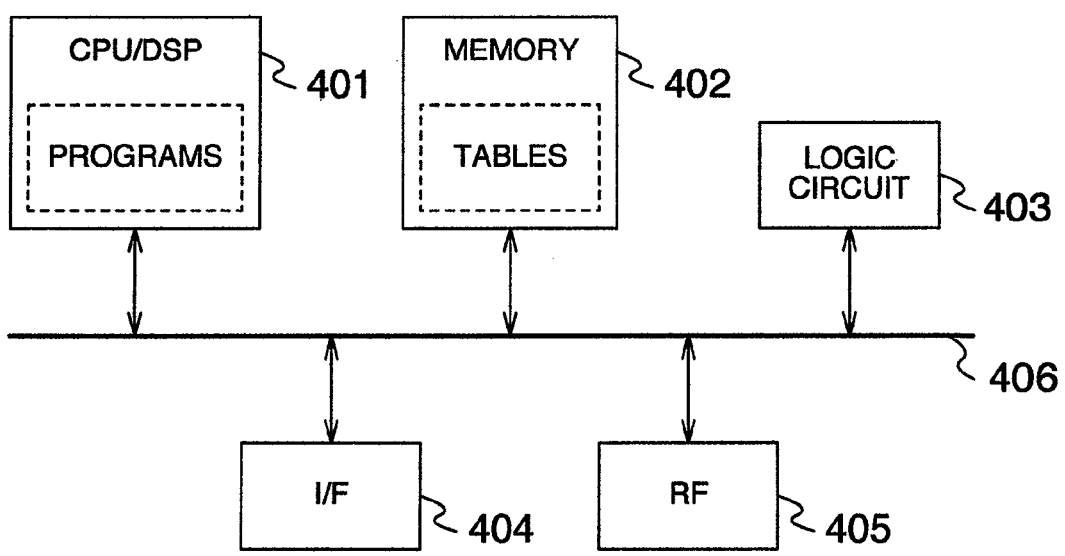
FIG. 9 is a diagram showing an example of the relation between the transmit power classes of mobile terminals and the limitation on the subbands.
FIG. 10 is a diagram schematically showing an example of the implementation of a base station in which the DSP and the CPU are main parts.

FIG. 9 is a diagram showing an example of the relation between the transmit power classes of the mobile terminals shown in FIG. 22 and the limitation on the subbands. In the example shown in FIG. 9, it is assumed that the transmit power of the transmit power class A is not smaller than the transmit power of class B and that the transmit power of class B is not smaller than the transmit power of class C. In the example, it is also assumed that the limitation on subband a is not tighter than the limitation on subband b and that the limitation on subband b is not tighter than the limitation on subband c. In this case, the limitation imposed when the channel assignment unit 531 assigns resource blocks is one of the following three and any of those limitations may be used.

In the first case, the limitation is that an assignment is possible only for the relation indicated by the symbol ○ in FIG. 9 but not for the relation indicated by Δ and X. In this case, a mobile terminal belonging to class A can be assigned only to subband a but not to subband b and subband c. Similarly, a mobile terminal belonging to class B can be assigned only to subband b but not to subband a and subband c. In addition, a mobile terminal belonging to class C can be assigned only to subband c but not to subband a and subband b.

In the second case, the limitation is that an assignment is possible for the relation indicated by ○ and Δ in FIG. 9 but not for the relation indicated by X. In this case, a mobile terminal belonging to class A can be assigned only to subband a but not to subband b and subband c. On the other hand, a mobile terminal belonging to class B can be assigned to subband a and subband b but not to subband c. In addition, a mobile terminal belonging to class C can be assigned to all subbands.

In the third case, the limitation is that an assignment is possible for the relation indicated by ○ in FIG. 9, impossible for the relation indicated by X, and conditionally possible for the relation indicated by Δ. In this case, an assignment is made first based on the same limitation as that in the first case and, after that, an assignment is possible if the relation between an unassigned mobile terminal and a free subband is the relation indicated by Δ in FIG. 9.

Although the number of transmit power classes of a mobile terminal is three and the number of subbands associated with different limitations is three in FIG. 9, they are exemplary only and any other values may be used. In addition, the number of transmit power classes of a mobile terminal need not match the number of types of subbands. The channel assignment unit 531 assigns resource blocks to a mobile terminal according to the limitation described above and, after that, notifies the dynamic ICIC control unit 540 about the congestion status of each subband as the congestion information.

Figure 11:
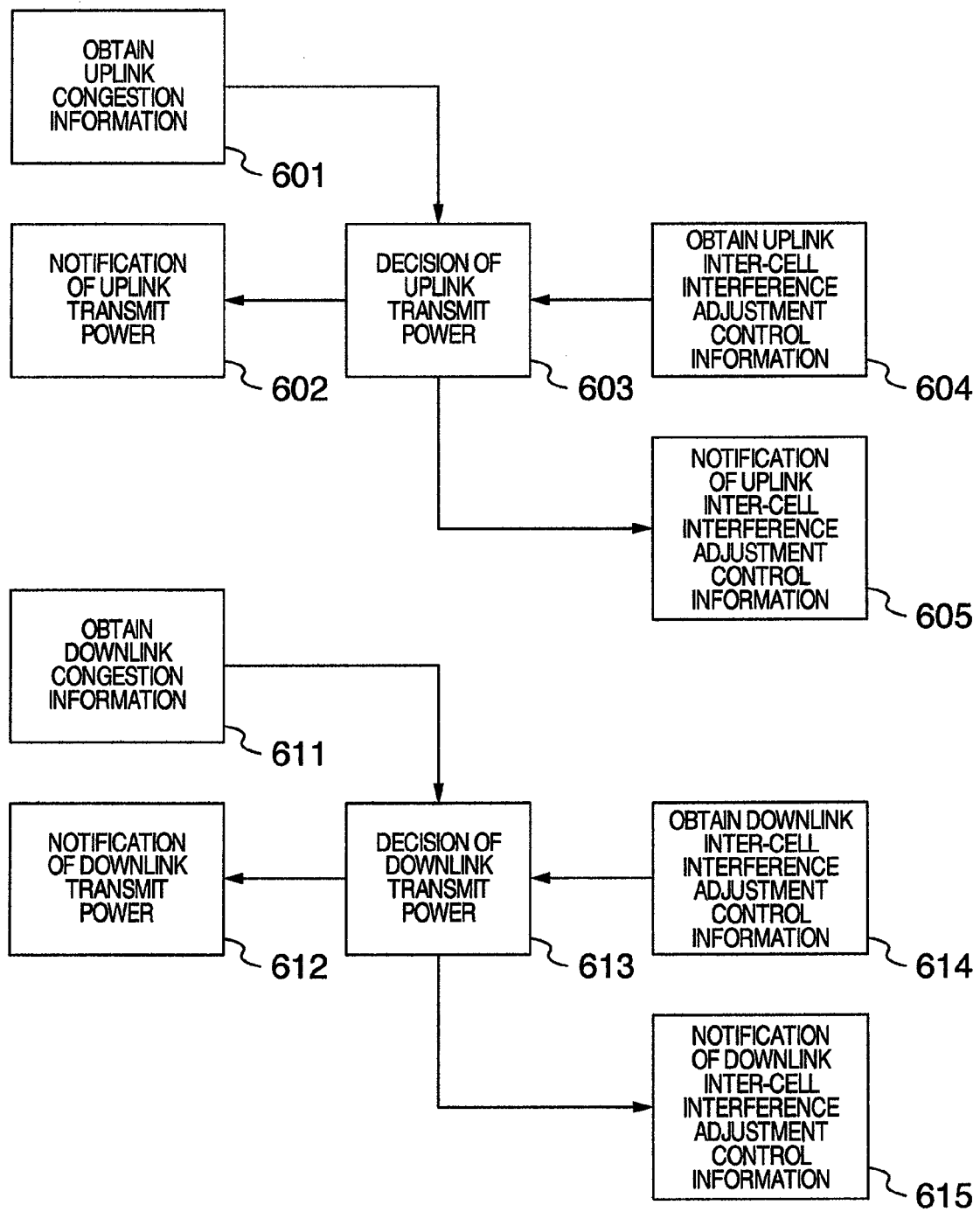
FIG. 11 is a diagram showing an example of the block diagram representing the signal processing of a dynamic ICIC control unit to which the present invention is applied.

FIG. 11 is a diagram showing an example of the block diagram representing the signal processing of the dynamic ICIC control unit 540 in this embodiment. The ICIC control unit 540 performs almost the same processing for the uplink and the downlink. An uplink congestion information obtaining unit 601 corresponds to a downlink congestion information obtaining unit 611, an uplink transmit power notification unit 602 corresponds to a downlink transmit power notification unit 612, an uplink transmit power decision unit 603 corresponds to a downlink transmit power decision unit 613, an uplink inter-cell interference adjustment control information obtaining unit 604 corresponds to a downlink inter-cell interference adjustment control information obtaining unit 614, and an uplink inter-cell interference adjustment control information notification unit 605 corresponds to a downlink inter-cell interference adjustment control information notification unit 615, respectively. For this reason, the following describes the units for the uplink but omits the description of the units for the downlink that perform the same processing in the corresponding units except for those that perform different processing.

In the description below, a resource block having a large inter-cell interference adjustment control information value, notified from this cell to other cells, refers to a resource block having a loose power limitation for this cell. For the uplink transmission, a resource block having a loose power limitation for this cell refers to a resource block to which a mobile terminal, which transmits signals with a high power, is assigned such as a mobile terminal that is located at the cell end or a mobile terminal that uses a coding method or modulation method with a high-efficiency frequency usage. The description below also assumes that, in this cell, tight power limitation is imposed on a resource block having a large inter-cell interference adjustment control information value notified from other cells to this cell and that, for the uplink transmission, the assignment is controlled so that a mobile terminal that transmits signals with a high power, such as a mobile terminal that is located at the cell end or a mobile terminal that uses a coding method or modulation method with a high-efficiency frequency usage, is not assigned to that resource block. Note that the reverse may also be used. For example, a resource block having a large inter-cell interference adjustment control information value, notified from this cell to the other cells, may refer to a resource block which has a tight power limitation in this cell and to which a mobile terminal that transmits signals with a high power, such as a mobile terminal that is located at the cell end or a mobile terminal that uses a coding method or modulation method with a high-efficiency frequency usage, is not assigned for the uplink transmission.

The uplink congestion information obtaining unit 601 notifies the uplink transmit power decision unit 603 about the congestion information notified by the channel assignment unit 531. The congestion information in this case is a value generated by dividing the number of users assigned to a subband by the number of resource blocks belonging to the subband or a value generated by time-averaging the value. If the value of a subband calculated in this way is larger than that of other subbands, it is judged that the subband is more congested than other subbands.

The uplink inter-cell interference adjustment control information obtaining unit 604 receives uplink inter-cell interference adjustment control information from one or more neighboring cells, averages the information for each resource block, and notifies the uplink transmit power decision unit 603 as the average uplink inter-cell interference adjustment control information. The uplink inter-cell interference adjustment control information obtaining unit 604 also calculates the resource occupancy rate of the other cells based on the uplink interference adjustment control information received from other cells and notifies the uplink transmit power decision unit 603 about the calculated resource occupancy rate. The resource occupancy rate is a value calculated, for example, by calculating the weighted average of the notified uplink interference adjustment control information for each resource block.

Figure 12:
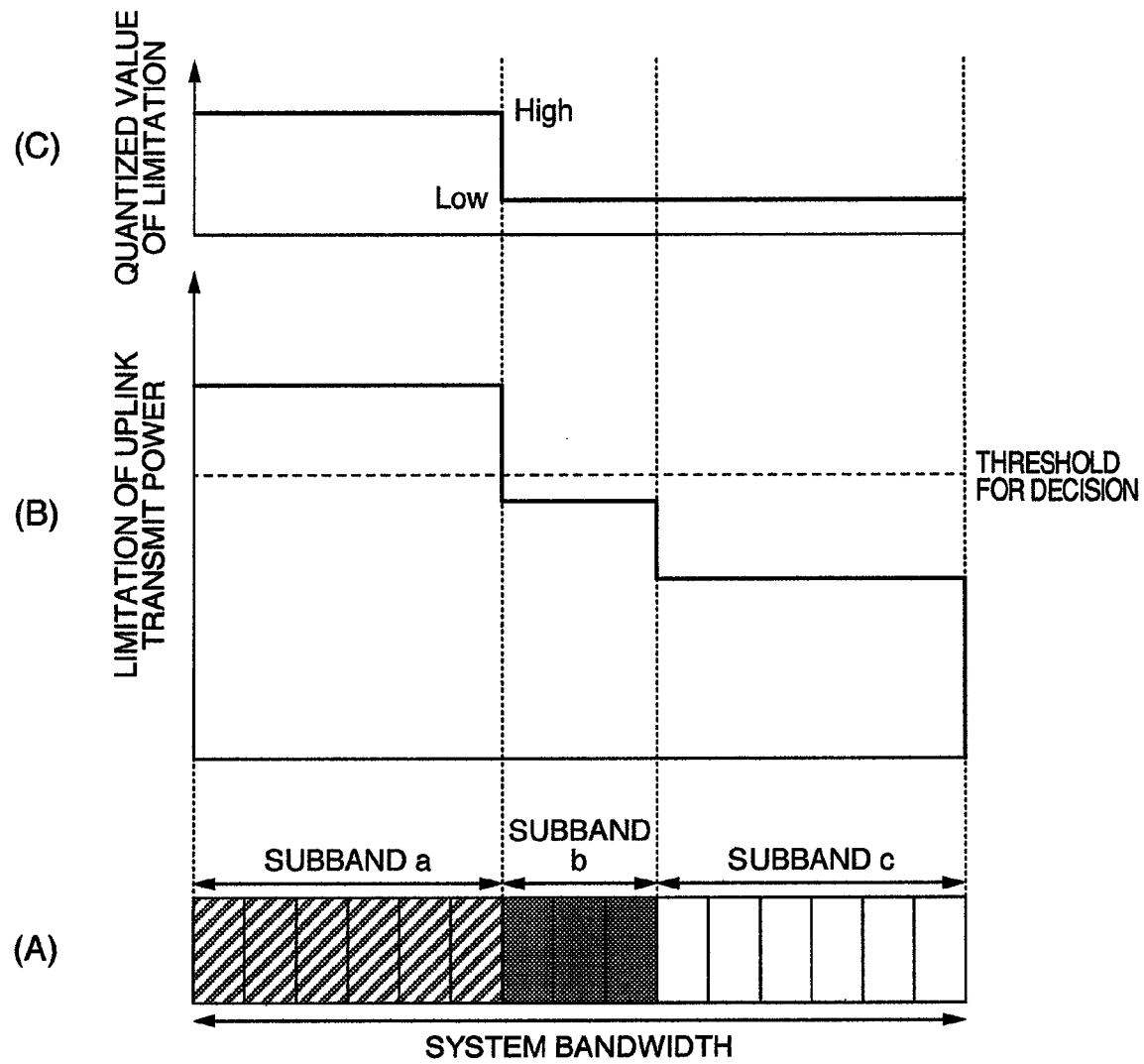
FIG. 12 is a diagram showing an example of subband partitioning and limited-powers in a system band.

In the initial state before obtaining the information, the uplink transmit power decision unit 603 partitions the system bandwidth into the initialized subbands as shown, for example, in (A) and (B) in FIG. 12, which shows an example of the subband partitioning and limited-powers in the system band in the figure, and decides the initialized limited-power for each subband. The uplink transmit power decision unit 603 notifies the uplink transmit power notification unit 602 and the uplink inter-cell interference adjustment control information notification unit 605 about the decided limited-power.

The uplink transmit power notification unit 602 notifies the channel assignment unit 531 about the notified transmit power limitation information on each subband.

Figure 13:
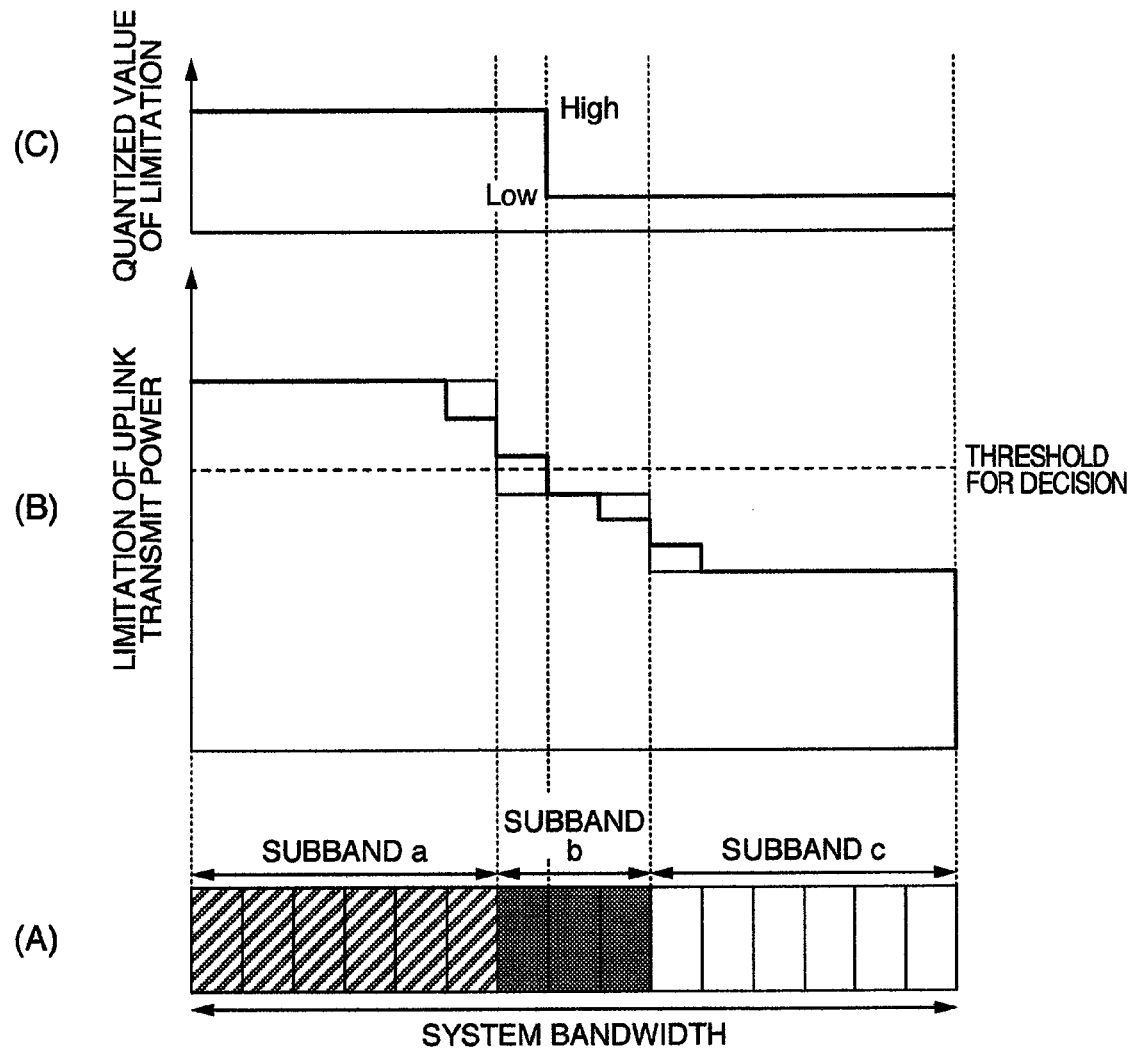
FIG. 13 is a diagram showing another example of subband partitioning and limited-powers in a system band.

The uplink inter-cell interference adjustment control information notification unit 605 quantizes the limited-power into the 1-bit information, High and Low, for each resource block as shown in (C) in FIG. 12 and notifies other cells as the inter-cell interference adjustment control information. It is also possible to average the limited-powers using the information on the neighboring resource blocks as shown in (B) in FIG. 13 and, after that, quantize the averaged value, and notify the other cells about the quantized inter-cell interference adjustment control information.

Figure 14:
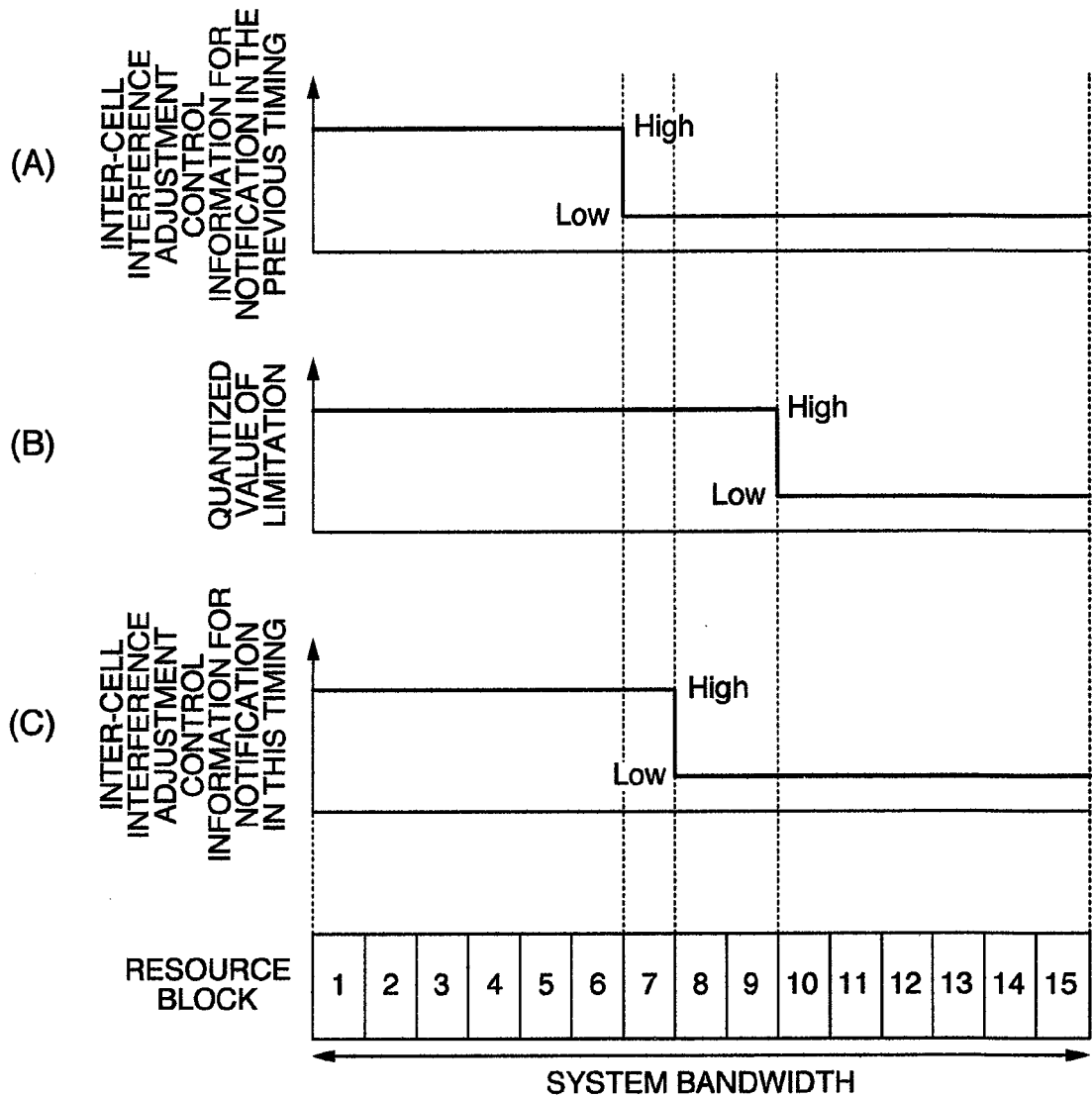
FIG. 14 is a diagram schematically showing an example of a limitation on a change in inter-cell interference adjustment control information.

A limitation may be placed also on a change in the inter-cell interference adjustment control information notified to other cells. FIG. 14 is a diagram showing an example of a limitation on a change in the inter-cell interference adjustment control information. The example in FIG. 14 shows that the inter-cell interference adjustment control information, notified previously to other cells, is high for resource blocks 1-6 and low for resource blocks 7-15 as shown in FIG. 14(A) and that the quantized result of the limited-power, notified by the uplink transmit power decision unit 603, is high for resource blocks 1-9 and low for resource blocks 10-15 as shown in FIG. 14(B). When a limitation is placed on a change in the inter-cell interference adjustment control information, the information in FIG. 14(B) is not notified directly to other cells but adjustment is made so that the change from the previously notified information is reduced. For example, as shown in FIG. 14(C), the difference between the information at previous notification time and the information on the current result is reflected only one resource block, with the result that the inter-cell interference adjustment control information, which is high for resource blocks 1-7 and low in resource blocks 8-15, is notified to other cells. In the example in FIG. 14(A), the resource occupancy rate is calculated as (1×6+0× 9)/15=0.4 where the score is 1 when the inter-cell interference adjustment control information is high and 0 when the inter-cell interference adjustment control information is low.

Figure 15:
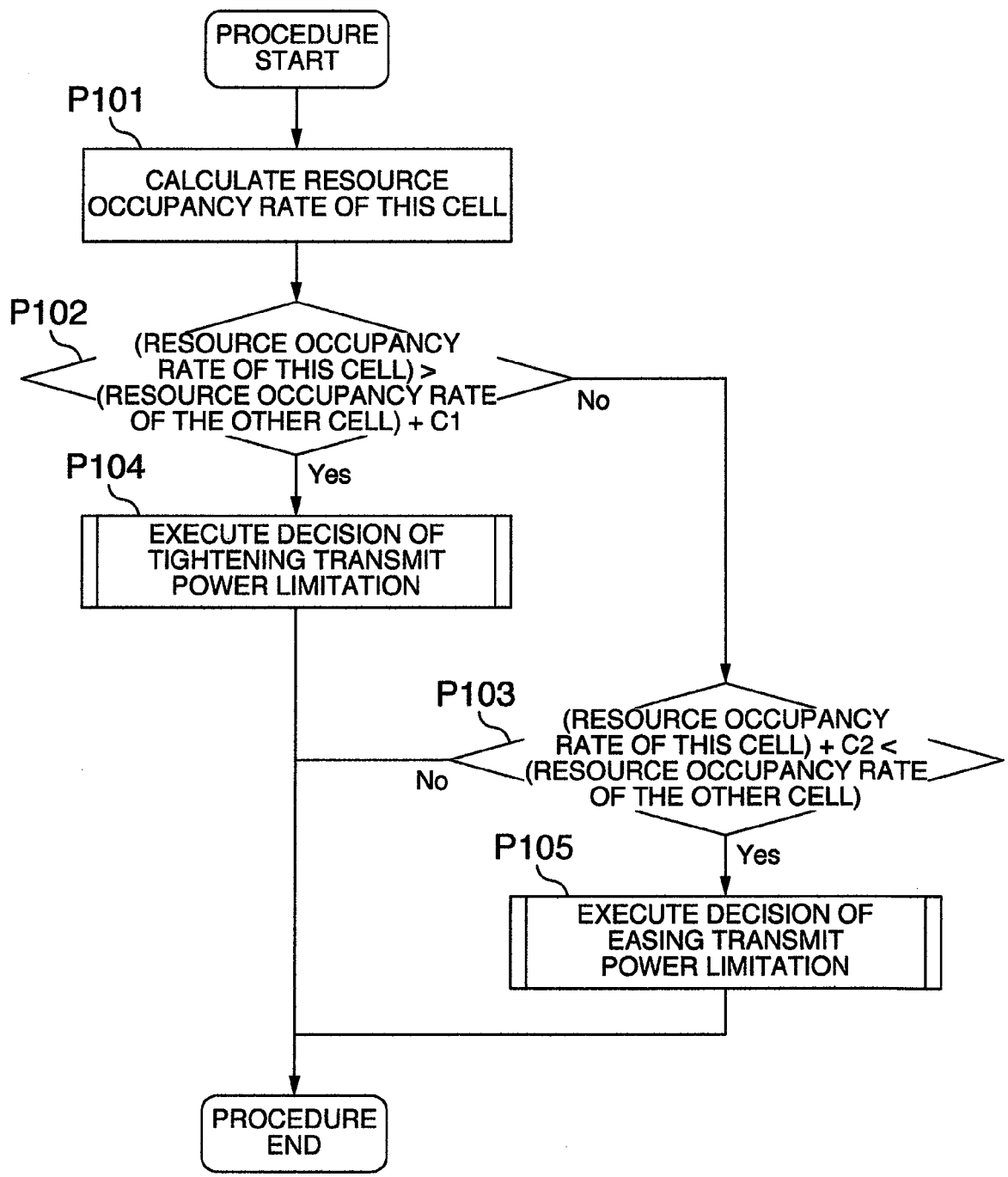
FIG. 15 is a flowchart showing an example of the processing flow of a transmit power decision unit.

FIG. 15 is a flowchart showing an example of the processing flow of the uplink transmit power decision unit 603. First, in processing P101, the uplink transmit power decision unit 603 calculates the resource occupancy rate of this cell using the same calculation method as that used by the uplink inter-cell interference adjustment control information obtaining unit 604.

Next, in processing P102, the uplink transmit power decision unit 603 compares the resource occupancy rate of this cell with the resource occupancy rate of other cells notified by the uplink inter-cell interference adjustment control information obtaining unit 604 and passes control to processing P104 if the resource occupancy rate of this cell is larger than the resource occupancy rate of other cells by parameter C1 or more, or to processing P103 if not. In processing P103, the uplink transmit power decision unit 603 compares the resource occupancy rate of this cell with the resource occupancy rate of other cells notified by the uplink inter-cell interference adjustment control information obtaining unit 604 and passes control to processing P105 if the resource occupancy rate of this cell is not smaller than the resource occupancy rate of other cells by parameter C2 or more or terminates the processing of the flowchart if not. Note that the parameters used for the comparison, C1 and C2, are those that affect the stability of the transmit power limitation decision performed by the uplink transmit power decision unit 603. The selection of larger values results in a less-variable, stable operation while the selection of smaller values results in an operation in which the transmit power limitation is changed greatly.

After executing processing P104 or processing P105, the processing in the flowchart in FIG. 15 is terminated. It is also possible to restart the processing beginning at processing P101 when the processing is terminated after execution of processing P104 or processing P105.

Figure 16:
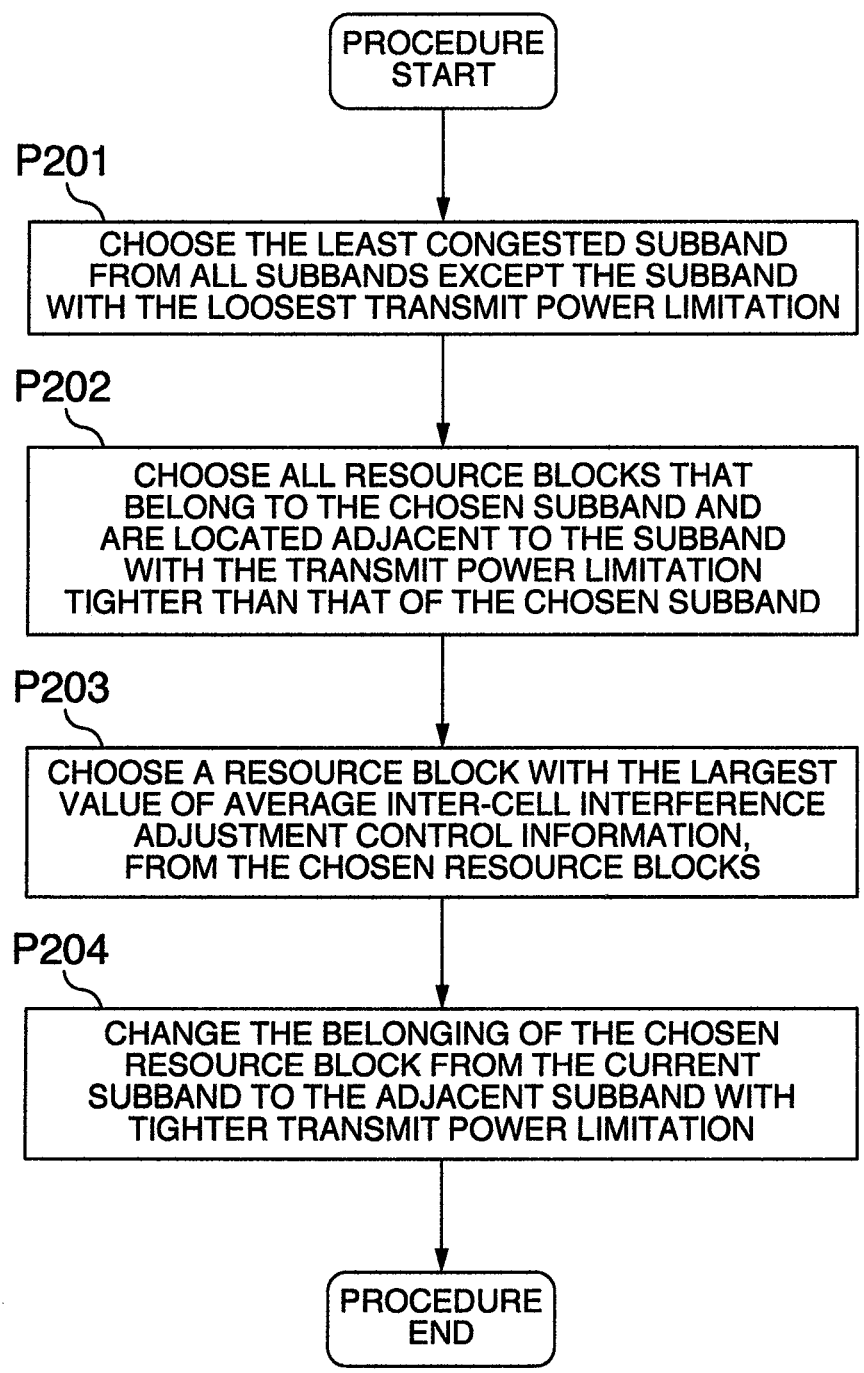
FIG. 16 is a flowchart showing an example of the processing flow of the decision of tightening a transmit power limitation.

The processing flow of the decision of tightening transmit power limitation in processing P104 is as shown in the flowchart in FIG. 16.

In the processing of the decision of tightening transmit power limitation, the uplink transmit power decision unit 603 first chooses, in processing P201, the least congested subband, notified by the uplink congestion information obtaining unit 601, from all subbands except the subband with the loosest transmit power limitation. Next, in processing P202, the uplink transmit power decision unit 603 chooses all resource blocks that belong to the chosen subband and are located adjacent to the subband with the transmit power limitation tighter than that of the chosen subband. Next, in processing P203, the uplink transmit power decision unit 603 chooses a resource block with the largest value of average inter-cell interference adjustment control information, notified by the uplink inter-cell interference adjustment control information obtaining unit 604, from all chosen resource blocks chosen in processing in P202. Next, in processing P204, the uplink transmit power decision unit 603 changes the belonging of the resource block selected in processing in P203 to a subband with tighter transmit power limitation and then terminates the processing.

The processing flow of the decision of easing transmit power limitation in processing P105 is as shown in the flowchart in FIG. 17. In the processing of the decision of easing transmit power limitation, the uplink transmit power decision unit 603 first chooses, in processing P301, the most congested subband, notified by the uplink congestion information obtaining unit 601, from all subbands except the subband with the tightest transmit power limitation. Next, in processing P302, the uplink transmit power decision unit 603 chooses all resource blocks that belong to the chosen subband and are located adjacent to the subband with the transmit power limitation looser than that of the chosen subband. Next, in processing P303, the uplink transmit power decision unit 603 chooses a resource block with the smallest value of average inter-cell interference adjustment control information, notified by the uplink inter-cell interference adjustment control information obtaining unit 604, from all chosen resource blocks chosen in processing in P302. Next, in processing P304, the uplink transmit power decision unit 603 changes the belonging of the resource block chosen in processing in P303 to a subband with looser transmit power limitation and then terminates the processing.

The adjacent resource blocks described above may be resource blocks whose frequencies are adjacent or resource blocks which are logically adjacent. For example, in a system where resources are assigned to virtual resource blocks and, after that, the virtual resource blocks are mapped to physical resource blocks, the adjacent resource blocks may be physical resource blocks that are adjacent or virtual resource blocks that are adjacent.

Although the signal processing blocks have been described in the configuration diagram given above, each of those blocks need not to have an independent entity but the operation of each block may be implemented using general-purpose processing modules.

For example, FIG. 10 is a diagram showing the configuration of a base station device in which the DSP and the CPU are main parts. A block 401 is a CPU/DSP module that controls the signal processing operation and the signal processing, shown in the above embodiment, according to the program including the processing corresponding to the flowcharts shown in FIG. 15, FIG. 16, and FIG. 17. A block 402 is a memory module that stores the tables (for example, tables shown in FIG. 18, FIG. 19, FIG. 20, FIG. 21, and FIG. 22) that includes information on transmission signals and reception signals being processed or those before and after processing, as well as the tables used for the signal processing. A block 403 is a logic circuit module that controls the signal processing operation and the signal processing, shown in the embodiment given above, in the same manner as the CPU/DSP 401. A block 404 is an interface module that performs the input/output processing for the control signals, the transmission signals before signal processing, and the reception signals after signal processing. A block 405 is an RF module that converts the transmission signal to a radio frequency band signal and transmits the converted signal via the antenna and receives the reception signal via the antenna and converts the received signal to a baseband band signal. A bus 406 is a bus to which the modules described above are connected. The signal processing operation and the signal processing in the processing blocks described above are each controlled by the programs in the CPU/DSP module 401 and/or the operation circuits in the logic circuit module 403 and, as necessary, the memory module 402.

Although FIG. 10 shows the simplest implementation example in which the modules are shown as separate modules, each of the modules and the bus need not always be one module. For example, there may be multiple CPU/DSP modules 401 or multiple buses 406. When there are multiple buses 406, all busses need not be connected to all modules but, in addition to the bus connected to all modules, there may be a bus connected only to the memory module 402 and the logic circuit module 403.

For example, if the signal processing operation and the signal processing in all processing blocks can be controlled by the CPU/DSP module 401, the logic operation module 403 need not be included. Conversely, if the signal processing operation and the signal processing in all processing blocks can be controlled by the logic operation module 403, the CPU/DSP module 401 need not be included. That is, at least a part of the processing shown in FIGS. 15, 16, and 17 may be configured by hardware.

This embodiment is applicable also to the case in which consecutive resources are assigned collectively to one mobile station in order to fully utilize the pilot signal in channel estimation. For example, in the LTE communication method where consecutive resources must be assigned to one mobile station in the uplink transmission from a mobile terminal to a base station, this embodiment allows the resources to be assigned without resource fragmentation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A signal processing method for use in a multi-carrier wireless communication system having a plurality of subcarriers, said method comprising the steps of:
    assigning resources in units of resource blocks each composed of one or more subcarriers;
    notifying inter-cell interference adjustment control information to each other among base stations;
    deciding a transmit power limitation on each of the resource blocks in a cell based on the inter-cell interference adjustment control information;
    changing the decision of the transmit power limitation sequentially beginning at a resource block having a transmit power limitation different from the transmit power limitation of an adjacent resource block.

2. The signal processing method according to claim 1 wherein
    the inter-cell interference adjustment control information is a relative narrowband Tx power.

3. The signal processing method according to claim 1 wherein the inter-cell interference adjustment control information is a high interference indication.

4. The signal processing method according to claim 1, further comprising the step of:
    notifying the inter-cell interference adjustment control information on each resource block to other base stations after generating an average of the inter-cell interference adjustment control information on adjacent resource blocks.

5. A radio base station for use in a multi-carrier wireless communication system having a plurality of subcarriers, said radio base station comprising:
    a resource assignment unit that assigns resources in units of resource blocks each composed of one or more subcarriers;
    a notification unit that notifies inter-cell interference adjustment control information to neighboring base stations;
    an acceptance unit that accepts an inter-cell interference adjustment control information notification from neighboring base stations;
    a limitation decision unit that decides a transmit power limitation on each of the resource blocks in a cell based on the inter-cell interference adjustment control information; and
    a limitation decision change unit that changes the decision of the transmit power limitation sequentially beginning at a resource block having a transmit power limitation different from the transmit power limitation of an adjacent resource block.

6. The base station according to claim 5 wherein the inter-cell interference adjustment control information is a relative narrowband Tx power.

7. The base station according to claim 5 wherein the inter-cell interference adjustment control information is a Uplink high interference indication.

8. The base station according to claim 5, wherein said notification unit notifies the inter-cell interference adjustment control information on each resource block to other base stations after generating an average of the inter-cell interference adjustment control information on adjacent resource blocks.

* * * * *